J. B. NORTHROP.
PRESERVING JAR.
APPLICATION FILED MAR. 13, 1914.
1,191,028.
Patented July 11, 1916.
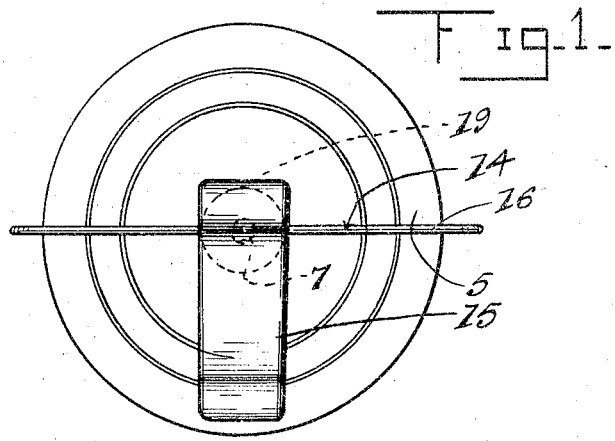
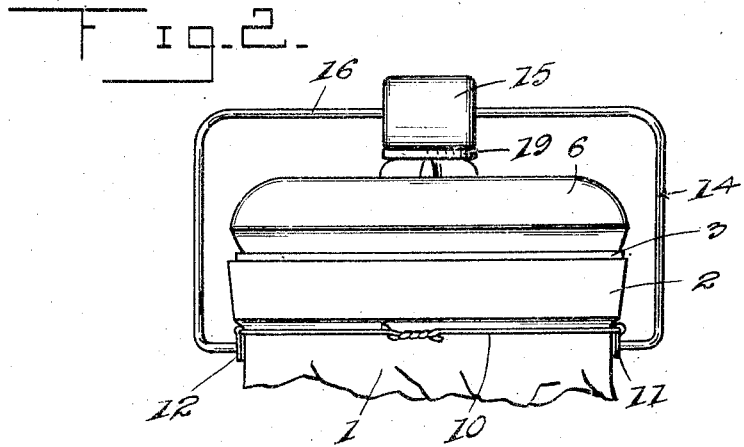
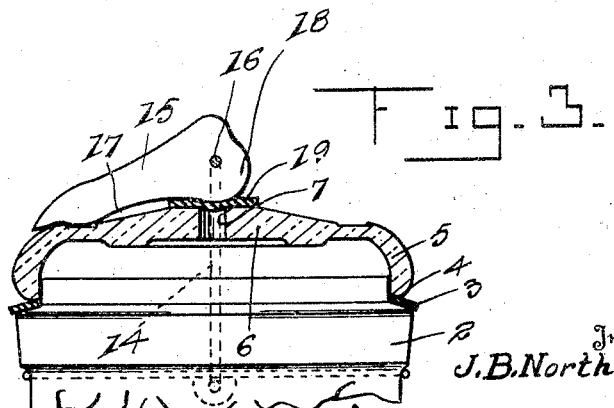
Inventor
J. B. Northrop.

UNITED STATES PATENT OFFICE.

JOHN B. NORTHROP, OF FORT SMITH, ARKANSAS.

PRESERVING-JAR.

1,191,028.

Specification of Letters Patent.

Patented July 11, 1916.

Application filed March 13, 1914. Serial No. 824,402.

*To all whom it may concern:*

Be it known that I, JOHN B. NORTHROP, a citizen of the United States, residing at Fort Smith, in the county of Sebastian and State of Arkansas, have invented certain new and useful Improvements in Preserving-Jars; and I do hereby declare the following to be a full, clear, and exact description of the invention, such as will enable others skilled in the art to which it appertains to make and use the same.

This invention relates to preserving containers and more particularly to a fruit jar for preserving various kinds of fruit or vegetables.

An object of this invention is the provision of a preserving jar as specified, which has a removable cover of non-corrosive material which is held in fluid tight engagement with the mouth of the jar by a resilient member and a lever carried thereby for binding abutment against the outer surface of the cover to bind the same upon the jar.

Another object of this invention is the provision of a non-corrosive cover for the preserving jar which is provided with a centrally located vent opening, which opening is closed by a pliable disk held in engagement therewith by the lever, when the jar is sealed.

With the foregoing and other objects in view this invention consists in such novel features of construction, combination and arrangements of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1 is a top plan view of the improved preserving jar. Fig. 2 is a side elevation of the upper end of a fruit jar showing the cover for the mouth of the same held thereon by the lever and resilient bail member, and Fig. 3 is a central sectional view through Fig. 2 of the drawings.

Referring to the drawings by numerals, 1 designates a preserving jar or container, such as is commonly employed for the canning or preserving of various fruits and vegetables, and the jar is preferably constructed of glass as is common in the practice, having an annular flange 2 formed thereon adjacent the mouth or open end of the same. The flange 2 has a rubber washer 3 mounted upon the upper edge of the same, which washer is engaged by the lower edge of the annular depending rim 5, which is formed upon the cover 6. The cover 6 is provided with an opening 7, which opening is centrally located in the cover and extends entirely therethrough forming an air vent for the interior of the jar. A wire 10 is mounted about the outer surface of the neck of the jar 1 directly below the lower edge of the flange 2, and it has lugs 11 and 12 carried thereby and disposed diametrically opposite each other upon the jar. The lugs 11 and 12 have a resilient bail member 14 connected thereto. The bail member 14 has its ends seated within openings in the lugs 11 and 12 and passes upwardly along the jar body, and laterally across the top of the cover, having a lever 15 slidably and pivotally mounted upon the straight portion 16 which extends diametrically across the cover 6. The lever 15 has its surface 17 shaped to conform to the configuration of the outer surface of the cover 6, so as to lie in abutting engagement therewith when in a locking position as is indicated in Fig. 3 of the drawings. The lever 15 has an enlargement 18 formed upon its end which is pivotally mounted upon the bail member 14 which enlargement is disposed eccentrically of the pivotal point of the lever so as to administer a downward binding engagement upon the cover 6 when the lever is actuated downwardly. The engaging edge of the enlargement 18 is curved and arranged to produce the greatest pressure when the lever is in its locked position. The enlargement 18 of the lever 15 is positioned directly above the vent 7, when the lever is in a locking position, and the pliable washer 19 is securely held inserted between the face of the lug 18 and the upper face of the cover 6 forming a closure for the vent 7 by the downward pressure of the enlargement.

The vent 7 is provided in the lid of the jar so that after the fruit or vegetables have been put into the jar, the cover can be mounted upon the jar and the latter reheated in a steamer or other suitable heating means until steam issues from the jar through the vent opening, which heating will destroy all spores contained within the fruit, preventing acid decomposition and the generation of gas, which often destroys the fruit and breaks the jar. Furthermore the vent opening will permit the ingress of air into the jar, when the lever is actuated, for releasing the binding engagement therebetween and the cover, and permit of the easy removal of the cover from the jar.

In practical fields certain minor features of construction may necessitate alterations to which the patentee is entitled provided such alterations are comprehended within the scope of what is claimed.

What I claim is:—

The combination with a jar provided on its exterior below its mouth with an annular flange, a cover fitted on the mouth of the jar and provided with a depending peripheral flange extending downwardly on the exterior of the jar to the said flange thereof, said cover being provided in its outer face adjacent to its periphery with an annular groove and having at its center a relatively large vent opening, a bail connected with the jar and extending over the cover, an elastic washer arranged on the center of the cover and the vent opening and a locking lever pivotally mounted on the bail and having an eccentrically arranged head presenting a curved face to the washer and arranged to compress same and bow the said washer downwardly within the vent opening, said locking lever terminating short of the outer edge of the cover and provided with an outer projecting portion fitting in the annular groove of the cover for holding the lever against displacement.

In testimony whereof I affix my signature in presence of two witnesses.

JOHN B. NORTHROP.

Witnesses:
 LEIGH KELLEY,
 R. C. JOHNSTON.